(12) United States Patent  
Soe et al.

(10) Patent No.: US 10,705,993 B2  
(45) Date of Patent: Jul. 7, 2020

(54) PROGRAMMING AND CONTROLLING COMPUTE UNITS IN AN INTEGRATED CIRCUIT

(71) Applicant: Xilinx, Inc., San Jose, CA (US)

(72) Inventors: Soren T. Soe, San Jose, CA (US); Idris I. Tarwala, Tracy, CA (US); Ellery Cochell, Sunnyvale, CA (US)

(73) Assignee: Xilinx, Inc., San Jose, CA (US)

( * ) Notice: Subject to any disclaimer, the term of this patent is extended or adjusted under 35 U.S.C. 154(b) by 0 days.

(21) Appl. No.: 16/194,911

(22) Filed: Nov. 19, 2018

(65) Prior Publication Data

US 2020/0159680 A1    May 21, 2020

(51) Int. Cl.
*G06F 13/28* (2006.01)
*G06F 13/24* (2006.01)

(52) U.S. Cl.
CPC .............. *G06F 13/24* (2013.01); *G06F 13/28* (2013.01); *G06F 2213/24* (2013.01); *G06F 2213/28* (2013.01)

(58) Field of Classification Search
None
See application file for complete search history.

(56) References Cited

U.S. PATENT DOCUMENTS

| | | | |
|---|---|---|---|
| 4,245,306 A * | 1/1981 | Besemer | G06F 15/167 709/233 |
| 6,360,243 B1 | 3/2002 | Lindsley | |
| 6,477,598 B1 * | 11/2002 | Yu | G06F 13/1647 365/189.14 |
| 7,328,277 B2 * | 2/2008 | Hussey | G06F 9/30043 370/389 |
| 7,428,603 B2 * | 9/2008 | Henson | G06F 13/1694 710/22 |
| 7,669,037 B1 | 2/2010 | Schumacher | |
| 7,673,087 B1 | 3/2010 | Ansari | |
| 7,737,725 B1 | 6/2010 | Ansari | |
| 7,743,176 B1 | 6/2010 | Turney | |

(Continued)

FOREIGN PATENT DOCUMENTS

WO    2012131523 A1    10/2012

OTHER PUBLICATIONS

Specification and drawings for U.S. Appl. No. 15/988,900, filed May 24, 2018, Soren T. Soe et al.

(Continued)

*Primary Examiner* — Elias Mamo
(74) *Attorney, Agent, or Firm* — Kevin T. Cuenot (57) ABSTRACT

An integrated circuit (IC) can include a command queue having a plurality of slots corresponding to commands from a host processor for execution by a plurality of compute units of the IC and a command request register having a plurality of locations corresponding to the plurality of slots in the command queue. The command request register is configured to generate an interrupt indicating a new command stored within the command queue. The IC can include a controller configured to, in response to the interrupt from the command request register, determine a selected compute unit that is idle from the plurality of compute units to execute the new command. The IC can also include a compute unit direct memory access circuit configured to provide the new command to the available compute unit.

19 Claims, 5 Drawing Sheets

(56) References Cited

U.S. PATENT DOCUMENTS

| | | | |
|---|---|---|---|
| 7,934,113 B2* | 4/2011 | Chard | H04L 7/02 |
| | | | 712/1 |
| 8,315,634 B2* | 11/2012 | Gustavsson | H04L 47/10 |
| | | | 370/229 |
| 9,405,550 B2* | 8/2016 | Biran | G06F 9/3877 |
| 9,547,535 B1 | 1/2017 | Wilt | |
| 2004/0028141 A1 | 2/2004 | Hsiun | |
| 2007/0283358 A1 | 12/2007 | Kasahara | |
| 2009/0217275 A1 | 8/2009 | Krishnamurthy | |
| 2010/0146256 A1* | 6/2010 | Luo | G06F 12/0638 |
| | | | 713/2 |
| 2010/0325638 A1 | 12/2010 | Nishimaki | |
| 2011/0131430 A1 | 6/2011 | Krishnamurthy | |
| 2012/0054771 A1 | 3/2012 | Krishnamurthy | |
| 2013/0031553 A1 | 1/2013 | Hou | |
| 2013/0117533 A1 | 5/2013 | Hayek | |
| 2014/0344815 A1 | 11/2014 | Ginzburg et al. | |
| 2015/0135182 A1 | 5/2015 | Liland | |
| 2015/0234679 A1 | 8/2015 | Moyer | |
| 2015/0293775 A1 | 10/2015 | Persson | |
| 2016/0011907 A1 | 1/2016 | Moyer | |
| 2016/0026908 A1* | 1/2016 | van der Merwe | G06K 19/06112 |
| | | | 235/375 |
| 2016/0055106 A1 | 2/2016 | Ansari | |
| 2016/0098365 A1 | 4/2016 | Bshara | |
| 2016/0132441 A1 | 5/2016 | Sstyles | |
| 2016/0335215 A1 | 11/2016 | Biran | |
| 2018/0308197 A1 | 10/2018 | Vembu | |
| 2019/0026157 A1 | 1/2019 | Suzuki | |
| 2019/0347125 A1 | 11/2019 | Sankaran | |
| 2019/0361708 A1 | 11/2019 | Soe | |

OTHER PUBLICATIONS

Hussain, T. et al., "PPMC: Hardware Scheduling and Memory Management Support for Multi Accelerators," in 22nd Int'l. Conf. on FPL, Aug. 2012 [retrieved Nov. 27, 2019], retrieved from the Internet: <URL: https://ieeexplore.ieee.org/document/6339373>, (DOI: 10.1109/FPL.2012.6339373), pp. 571-574.

WIPO Appln. PCT/US2019/031443, Invitation to Pay Add'l. Fees, Communication Relating to the Results of the Partial Int'l. Search, and Provisional Opinion Accompanying the Partial Search Result, dated Jul. 3, 2019, 11 pages.

\* cited by examiner

PROGRAMMING AND CONTROLLING COMPUTE UNITS IN AN INTEGRATED CIRCUIT

TECHNICAL FIELD

This disclosure relates to integrated circuits (ICs) and, more particularly, to programming and controlling compute units within an IC for hardware acceleration.

BACKGROUND

A heterogeneous computing platform (HCP) refers to a type of data processing system that includes a host processor and one or more other different processing devices. The host processor is typically implemented as a central processing unit (CPU). The host processor is coupled to the other processing devices through interface circuitry. The other processing devices are architecturally different from the host processor. Still, the processing devices are capable of performing operations, e.g., executing applications, offloaded from the host processor and making results of the operations available to the host processor.

In some cases, the processing devices are adapted to execute program code. Such processing devices typically have an instruction set architecture that differs from the host processor. Examples of these other processing devices include, but are not limited to, graphics processing unit(s) (GPUs), digital signal processor(s) (DSPs), and so forth.

In other cases, the processing devices that perform operations offloaded from the host processor include devices adapted to hardware accelerate program code. These processing devices include circuitry that implements the offloaded operation as hardware. The circuitry operates in a manner that is functionally equivalent to execution of the program code (e.g., the offloaded operation). Examples of processing devices capable of hardware acceleration include programmable integrated circuits (ICs) such as field programmable gate arrays (FPGAs), partially programmable ICs, application specific ICs (ASICs), and so forth. Appreciably, an HCP may include a combination of processing devices where one or more are adapted to execute program code and one or more others are adapted to hardware accelerate program code.

Implementing program code in hardware may provide a variety of benefits such as faster operation, reduced power consumption, redundancy, etc. Despite the fact that implementing an application as hardware provides benefits that may or may not include faster operation, the implementation of program code and/or an application in hardware is typically referred to as "hardware acceleration."

In any case, the host processor is charged with offloading operations to the processing devices and retrieving results from the processing devices. The ability of the host processor to efficiently move the necessary data to and from the processing devices can significantly affect the overall efficiency and performance of the HCP.

SUMMARY

One or more embodiments are directed to an integrated circuit (IC). The IC includes a command queue having a plurality of slots configured to store commands from a host processor for execution by a plurality of compute units of the IC and a command request register having a plurality of locations corresponding to the plurality of slots in the command queue. The command request register is configured to generate an interrupt indicating a new command stored within the command queue. The IC includes a controller configured to, in response to the interrupt from the command request register, determine a selected compute unit that is idle from the plurality of compute units to execute the new command and a compute unit direct memory access circuit configured to provide the new command to the selected compute unit.

One or more embodiments are directed an IC. The IC includes a compute unit interrupt circuit configured to, in response to receiving an interrupt from a selected compute unit of a plurality of compute units indicating that the selected compute unit is finished processing, signal that the selected compute unit is finished processing and a compute unit completion register configured to generate an interrupt in response to the signal from the compute unit interrupt circuit. The IC includes a controller configured to, in response to the interrupt from the compute unit completion register, determine a selected command of a plurality of commands offloaded from a host processor was executed by the selected compute unit and output the selected command and a command completion register configured to generate an interrupt to the host processor indicating that the selected command of the plurality of commands has finished processing.

One or more embodiments are directed to a method. The method includes, in response to a notification from a host processor indicating availability of a new command within a command queue, generating an interrupt to a controller, the controller, in response to the interrupt, determining a selected compute unit that is idle from a plurality of compute units to execute the new command, and the controller notifying a compute unit direct memory access circuit of the selected compute unit and the new command in the command queue. The method also includes providing, using the compute unit direct memory access circuit, the new command to the selected compute unit.

This Summary section is provided merely to introduce certain concepts and not to identify any key or essential features of the claimed subject matter. Other features of the inventive arrangements will be apparent from the accompanying drawings and from the following detailed description.

BRIEF DESCRIPTION OF THE DRAWINGS

The inventive arrangements are illustrated by way of example in the accompanying drawings. The drawings, however, should not be construed to be limiting of the inventive arrangements to only the particular implementations shown. Various aspects and advantages will become apparent upon review of the following detailed description and upon reference to the drawings.

DETAILED DESCRIPTION

While the disclosure concludes with claims defining novel features, it is believed that the various features described within this disclosure will be better understood from a consideration of the description in conjunction with the drawings. The process(es), machine(s), manufacture(s) and any variations thereof described herein are provided for purposes of illustration. Specific structural and functional details described within this disclosure are not to be interpreted as limiting, but merely as a basis for the claims and as a representative basis for teaching one skilled in the art to variously employ the features described in virtually any appropriately detailed structure. Further, the terms and phrases used within this disclosure are not intended to be limiting, but rather to provide an understandable description of the features described.

This disclosure relates to integrated circuits (ICs) and, more particularly, to programming and controlling compute units (CUs) within an IC for hardware acceleration. In accordance with the inventive arrangements described within this disclosure, a scheduling system is described that is capable of monitoring, tracking, and controlling operation of CUs within an IC. The CUs are the hardware blocks, or circuits, within the IC that are responsible for performing the operations offloaded from a host processor of a heterogeneous computing platform (HCP). The scheduling system is implemented within the same IC that includes the CUs and assists with the offloading of operations, provided in the form of commands, from the host processor to the CUs.

In conventional HCPs, scheduling is implemented as a software process executed by the host processor. The host processor is tasked with continually polling the individual CUs of the IC to determine when a CU is available for performing an operation. The polling of CUs consumes a significant amount of host processor time. Further, since the scheduling process is executed by the host processor, the host processor must wait until CUs are available before sending a command to the IC. The host processor sends a command only in response to determining that a CU is available for executing the command. As such, a delay is incurred between the time the CU becomes available and the time that the CU is able to begin execution on the command. This delay includes the time necessary to transfer the command, including data needed by the CU, from the host processor to the IC including the CU.

In accordance with the inventive arrangements described herein, the scheduling system is implemented in the same IC that includes the CUs. The scheduling system is capable of tracking the availability of the CUs within the IC. The scheduling system is also capable of receiving commands (e.g., operations) sent from the host processor. The scheduling system is capable of storing the commands in a command queue until such time that a CU becomes available to execute the command(s). As such, the host processor is capable of sending commands and continuing with other tasks without having to continually poll for an available CU and/or wait for a CU to become available before sending the command to the IC.

Once the command is queued within the scheduling system and a CU becomes available, transfer of the command to the CU requires no host processor involvement. The scheduling system transfers the command to the CU. Since the scheduling system and the CU are in the same IC, the time for transferring the command to the CU is relatively small. As such, the delay between the time that the CU becomes available and the time that the CU begins execution of the command is reduced, thereby increasing the speed of the HCP and reducing latency.

The scheduling system is further capable of determining when commands are finished executing. In response to determining that a command has finished executing, the scheduling system is capable of notifying the host processor. For example, the scheduling system is capable of writing to a command completion register included within the scheduling system in response to determining that a command has finished execution. The command completion register may be read by the host processor to ascertain the status of commands and the particular commands that have finished execution. Use of the command completion register allows the host processor to operate at the "command" level as opposed to managing each of the CUs of the IC individually.

Further aspects of the inventive arrangements are described below in greater detail with reference to the figures. For purposes of simplicity and clarity of illustration, elements shown in the figures have not necessarily been drawn to scale. For example, the dimensions of some of the elements may be exaggerated relative to other elements for clarity. Further, where considered appropriate, reference numbers are repeated among the figures to indicate corresponding, analogous, or like features.

Figure 1:
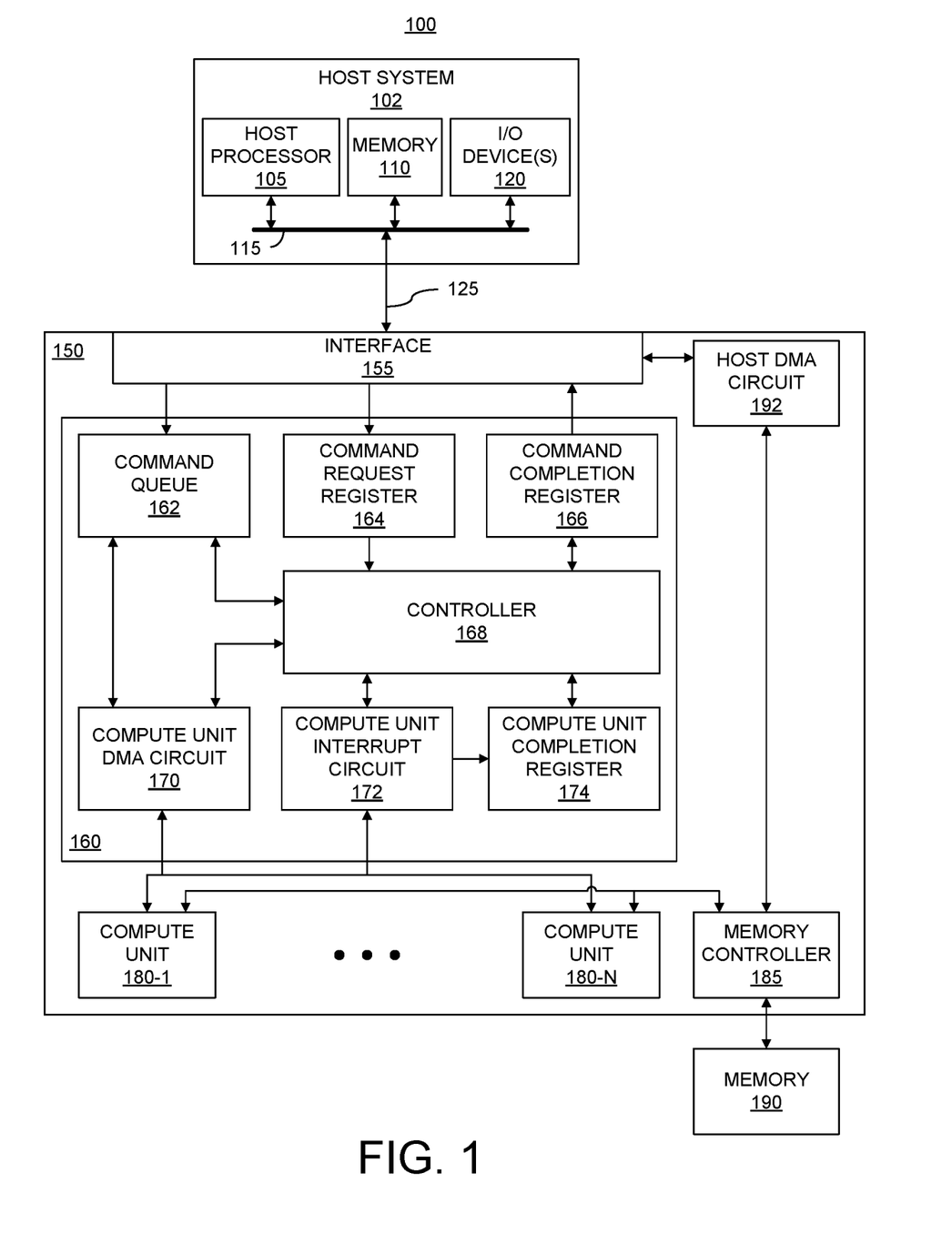
FIG. 1 illustrates an example of a heterogeneous computing platform in accordance with one or more embodiments described within this disclosure.

FIG. 1 illustrates an example of an HCP 100 in accordance with one or more embodiments described within this disclosure. In the example FIG. 1, HCP 100 includes a host system 102 and an IC 150 used as a hardware acceleration device.

Host system 102 may be implemented as a data processing system such as a computer or a server. Host system 102 includes a host processor 105 coupled to memory 110, and one or more input/output (I/O) devices through interface circuitry 115. Host system 102 is capable of storing computer readable instructions (program code) within memory 110. Memory 110 is an example of computer readable storage media. Host processor 105 is capable of executing the program code accessed from memory 110 via interface circuitry 115.

Memory 110 may include one or more physical memory devices such as, for example, a local memory and a bulk storage device. Local memory refers to non-persistent memory device(s) generally used during actual execution of program code. Examples of local memory include random-access memory (RAM) and/or any of the various types of RAM that are suitable for use by a processor during execution of program code (e.g., dynamic RAM or "DRAM" or static RAM or "SRAM"). A bulk storage device refers to a persistent data storage device. Examples of bulk storage devices include, but are not limited to, a hard disk drive (HDD), a solid-state drive (SSD), flash memory, a read-only memory (ROM), an erasable programmable read-only memory (EPROM), electrically erasable programmable read-only memory (EEPROM), or other suitable memory. Host system 102 may also include one or more cache memories (not shown) that provide temporary storage of at least some program code in order to reduce the number of times program code must be retrieved from a bulk storage device during execution.

Examples of interface circuitry 115 include, but are not limited to, a system bus and an input/output (I/O) bus. Interface circuitry 115 may be implemented using any of a variety of bus architectures. Examples of bus architectures may include, but are not limited to, Enhanced Industry Standard Architecture (EISA) bus, Accelerated Graphics Port (AGP), Video Electronics Standards Association (VESA) local bus, Universal Serial Bus (USB), and Peripheral Component Interconnect Express (PCIe) bus.

I/O devices 120 may be coupled to host system 102, e.g., interface circuitry 115, either directly or through intervening I/O controllers. Examples of I/O devices 120 include, but are not limited to, a keyboard, a display device, a pointing device, one or more communication ports, and a network adapter. A network adapter refers to circuitry that enables host system 102 to become coupled to other systems, computer systems, remote printers, and/or remote storage devices through intervening private or public networks. Modems, cable modems, Ethernet cards, and wireless transceivers are examples of different types of network adapters that may be used with host system 102.

In one or more embodiments, memory 110 stores an operating system (not shown) and one or more applications (not shown) that may be executed by host processor 105. A runtime library and a driver for IC 150 may also be executed by host processor 105. In one or more embodiments, the runtime library may be linked or otherwise incorporated with the application(s) executed by host processor 105. The runtime library includes the functions used to communicate with IC 150 using the driver.

Host system 102 may include fewer components than shown or additional components not illustrated in FIG. 1 depending upon the particular type of device and/or system that is implemented. In addition, the particular operating system, application(s), and/or I/O devices included may vary based upon system type. Further, one or more of the illustrative components may be incorporated into, or otherwise form a portion of, another component. For example, a processor may include at least some memory. Host system 102 may be used to implement a single computer or a plurality of networked or interconnected computers each implemented using the architecture of FIG. 1 or an architecture similar thereto.

IC 150 is communicatively linked to host system 102 via a communication link 125. For example, IC 150 may be coupled to a circuit board that may be included within host system 102. In one or more embodiments, communication link 125 is a PCIe link. It should be appreciated, however, that communication link 125 may be implemented using any of a variety of different connections and/or communication protocols and that the examples provided are not intended as limitations.

IC 150 includes an interface 155, a scheduling system 160, a plurality of CUs 180, and optionally a memory controller 185. CUs 180 are circuit blocks used for hardware acceleration. CUs 180 may be used to perform operations, e.g., commands, offloaded from host processor 105. In the example of FIG. 1, CUs 180 are controlled by scheduling system 160.

Interface 155 is capable of communicating over communication link 125 with host system 102. In particular embodiments, interface 155 is a PCIe interface that includes a direct memory access (DMA) circuit. The DMA portion of interface 155 is capable of reading and/or writing to one or more registers and/or memories such as command queue 162, command request register 164, command completion register 166, and/or memory 190 via memory controller 185.

Scheduling system 160 includes command queue 162, command request register 164, command completion register 166, a controller 168, a CU DMA circuit 170, a CU interrupt circuit 172, and a CU completion register 174. Though shown separately, in one or more other embodiments, interface 155 may be considered a part of scheduling system 160.

Command queue 162 is capable of receiving commands offloaded from host system 102. Command queue 162 may be implemented as a memory with supporting circuitry. For example, command queue 162 may be implemented as a random-access memory (RAM) with supporting logic. In one or more embodiments, command queue 162 is implemented as one or more Block RAMs (BRAMs) within IC 150. Command queue 162 may be written to by host processor 105 (e.g., in executing the runtime library and/or driver) and read and written by controller 168. Command queue 162 may be partitioned into a plurality of regions of fixed size referred to as "slots." Each slot is capable of storing a command (e.g., one command) from host processor 105.

In particular embodiments, each slot is the same size. In one aspect, the size of the slots may configured at compile time of the circuit design including scheduling system 160 since the size of the largest command to be handled by scheduling system 160 is known at that time. The slots may be sized to store the largest command handled by scheduling system 160. In one or more other embodiments, the size of the slots may be configured by the runtime library executed by host processor 105. In any case, host processor 105 is capable of writing new commands into available slots of command queue 162.

Command request register 164 is capable of notifying controller 168 when a new command is available within a slot of command queue 162. Command request register 164 may be implemented as a memory with supporting circuitry that may be written by host system 102 subsequent, e.g., in response to or immediately after, writing a command to command queue 162.

Command request register 164 includes a plurality of locations that may be written by host system 102. Each location, e.g., a bit location, within command request register 164 corresponds to a slot, e.g., on a one-to-one basis, within command queue 162. The action of host system 102 writing to command request register 164 causes command request register 164 to generate an interrupt to controller 168 indicating that a new command is available within a slot of command queue 162. In response to the interrupt, controller 168 reads command request register 164 to determine which slot or slots of command queue 162 contain a new command. Inclusion of command request register 164 relieves controller 168 from having to continually poll command queue 162 to determine whether new commands are available therein. Command request register 164 may be implemented as a clear-on-read register. Accordingly, once read by controller 168, contents of command request register 164 are cleared.

Once an interrupt is generated by command request register 164 to controller 168 and further commands are stored in command queue 162, host processor 105 continues to write to locations in command request register 164 corresponding to the different slots written with further new commands in command queue 162. The interrupt generated by command request register 164 may remain set rather than generating new interrupts at least until controller 168 services the interrupt. Controller 168, in response to receiving the interrupt from command request register 164, is capable of reading command request register 164 to determine the slots of command queue 162 that store new commands. Once controller 168 reads command request register 164, the contents of command request register 164 are cleared.

Command completion register 166 is capable of notifying host processor 105 when a particular command, or commands, have finished execution on a CU 180. Command completion register 166 may be implemented as a memory with supporting circuitry. Command completion register 166 may be sized to include a number of locations, e.g., bit locations, that is greater than or equal to the number of slots contained in command queue 162. In particular embodiments, each location in command completion register 166 corresponds to a slot of command queue 162, e.g., on a one-to-one basis. The value stored in a location in command completion register 166 indicates whether the command stored in the corresponding slot of command queue 162 has finished execution. A "1" written to bit position "X" in command completion register 166, for example, indicates that the command stored in slot "X" of command queue 162 has completed execution.

In one or more embodiments, controller 168 is capable of writing particular locations in command completion register 166 to indicate that the corresponding commands have completed execution in a CU 180. Command completion register 166 is capable of generating an interrupt to host processor 105 indicating that a command has completed execution. Host processor 105, by execution of the runtime library and/or driver, is capable of reading bits in command completion register 166 to determine whether any and/or which commands from command queue 162 have finished executing.

In particular embodiments, command completion register may include a plurality of sub-registers where each sub-register may be read independently of the other sub-registers by host processor 105. Further, each of the sub-registers is capable of generating an independent interrupt to host processor 105 indicating that a one or more locations within that sub-register have been written to indicate completion of command(s).

As an illustrative and non-limiting example, consider the case where there are 128 slots in command queue 162. Command completion register 166 may also include 128-bit locations corresponding to the 128 slots of command queue 162 (e.g., on a one-to-one basis). In this example, command completion register 166 includes 4 sub-registers, where each sub-register is a 32-bit register.

If, for example, the command from slot 10 (e.g., of slots 0-127) of command queue 162 completes execution, then bit location 10 (e.g., of bits 0-31), which corresponds to slot 10, in command completion register 166 is updated. Bit location 10 is located in the first of the plurality of sub-registers. The first of the plurality of sub-registers generates (e.g., sets) an interrupt to host processor 105. The interrupt may remain set until such time that the host processor 105 reads the first sub-register. As such, if other commands in slots 0-31 complete execution, the corresponding bit locations in command completion register 166 in the first sub-register are updated and the interrupt remains set until host processor 105 reads the first sub-register. Because each sub-register is capable of generating its own interrupt, host processor 105 need only read the first sub-register (e.g., 32-bits) rather than reading all 128-bits corresponding to each of the 4 sub-registers.

Continuing with the example, if the command from slot 35 of command queue 162 completes execution, then bit location 35, which corresponds to slot 35, in command completion register 166 is updated. Bit location 35 is located in the second of the plurality of sub-registers. The second of the plurality of sub-registers generates an interrupt to host processor 105. The interrupt may remain set until such time that the host processor 105 reads the second sub-register. As such, if other commands in slots 32-63 complete execution, the corresponding bit locations in command completion register 166 in the second sub-register are updated and the interrupt remains set until host processor 105 reads the second sub-register. Because each sub-register is capable of generating its own interrupt, host processor 105 need only read the second sub-register (e.g., 32-bits) rather than reading all 128-bits corresponding to each of the 4 sub-registers.

From the examples above, once an interrupt is generated for a particular sub-register of command completion register 166 and further CUs executing commands having corresponding locations within the same sub-register complete execution, the interrupt simply remains set. Host processor 105, when servicing the interrupt, reads the particular sub-register and determines each of the commands that have finished execution in the sub-register.

In one or more embodiments, controller 168 is implemented as a processor that is embedded in IC 150 and is capable of executing program code. In particular embodiments, the processor is hardwired. In other embodiments, the processor is a "soft-processor" implemented using programmable circuitry of IC 150. Controller 168 may execute firmware that causes controller 168 to perform the various operations described herein.

Controller 168 is capable of tracking the status of slots (and the commands stored therein) within command queue 162. Controller 168 is also capable of tracking the status of CUs 180. For example, controller 168 is capable of maintaining a list of CUs 180 that specifies whether each CU is idle (e.g., available) or started (e.g., busy). By tracking the status of CUs 180, controller 168 is capable of selecting idle CU(s) 180 to execute new command(s) stored in slot(s) of command queue 162.

In the example of FIG. 1, controller 168 does not have direct access to CUs 180 to determine the state of CUs 180. Controller 168 is capable of determining the state of CUs 180 based upon interrupts generated by the respective CUs 180 in response to completion of commands. The interrupts are directed to CU interrupt circuit 172 as described herein in greater detail below.

CU DMA circuit 170 is capable of configuring and starting CUs 180. Controller 168, for example, after selecting a CU 180 to execute a given command, notifies CU DMA circuit 170 of the particular slot (e.g., and command) to be executed. As noted, the slot is updated to specify the particular CU 180 that is selected to execute the command. CU DMA circuit 170 is capable of providing the command from the slot to the selected CU 180 for execution.

CU interrupt circuit 172 is capable of receiving and servicing interrupts generated by CUs 180. CU interrupt circuit 172 is capable of handling the interrupts generated by CUs 180, thereby relieving controller 168 from having to service the interrupts. CU interrupt circuit 172 is also capable of rearming (e.g., resetting) CUs 180 that complete execution of commands so that the CUs 180 may be programmed anew by CU DMA circuit 170 to execute further commands.

In one or more embodiments, the interface that couples CU interrupt circuit 172 to CUs 180 may be a control interface that operates at a slower clock frequency than is used to clock controller 168. By offloading the rearming of CUs 180 to CU interrupt circuit 172, controller 168 is free to perform other functions and need not wait for the rearming operations to complete over the slower interface.

In one or more embodiments, CU interrupts are wired sequentially, e.g., indexed, so that when a CU interrupt fires, CU interrupt circuit 172 is capable of identifying the particular CU 180 that initiated the interrupt based on the index of the interrupt wire. CU interrupt circuit 172 may include an address table that maps the interrupt indexes to specific CU addresses. In particular embodiments, the address table is constructed from lookup table RAM (e.g., LUTRAM) and contains a sequential list of CU addresses that have a 1:1 mapping to the corresponding interrupt indexes of the CUs. CU interrupt circuit 172 is capable of using the addresses from the address table to rearm the particular CU that generated the interrupt. The CU interrupt circuit 172 is capable of writing into the correct location in the CU completion register 174 based on the index of the interrupt that was received.

CU completion register 174 is written by CU interrupt circuit 172 and is read by controller 168. CU completion register 174 includes a plurality of locations, e.g., bit locations, where each location corresponds to a particular CU 180 (e.g., on a one-to-one basis). In response to CU interrupt circuit 172 receiving an interrupt from a selected CU 180 that has completed execution of a command, CU interrupt circuit 172 writes to the location in CU completion register 174 that corresponds to the selected CU 180.

In coordination with writing to a location in CU completion register 174, CU interrupt circuit 172 also generates an interrupt to controller 168. In particular embodiments, multiple interrupts from CUs 180 can be processed by CU interrupt circuit 172 before controller 168 reads CU completion register 174. As such, CU interrupt circuit 172 effectively coalesces multiple CU interrupt lines into a single interrupt line to controller 168.

Once an interrupt is generated by CU interrupt circuit 172 to controller 168 and further interrupts are received from different CUs 180, CU interrupt circuit 172 continues to write to the locations in CU completion register 174 corresponding to the different CUs that generated interrupts. The interrupt generated by CU interrupt circuit 172 remains set. Controller 168, in response to receiving the interrupt from CU interrupt circuit 172, is capable of reading CU completion register 174 to determine the particular CU(s) 180 that have finished execution based upon the particular locations that are written in CU completion register 174. CU completion register 174 may be implemented as a clear-on-read register. As such, the contents of CU completion register 174 may be cleared in response to controller 168 reading CU completion register 174.

Controller 168 is capable of translating between CUs 180 and commands (e.g., slots of command queue 162). Controller 168 can correlate each set bit of CU completion register 174 with commands (e.g., slots) previously started on the CUs that generated the interrupts. For example, controller 168 is capable of maintaining a data structure that correlates CUs and commands executed by the CUs based upon the slots of command queue 162. When a command is executed by a particular CU 180, controller 168 is capable of associating the CU with the particular slot of command queue 162 that stores the command.

Controller 168 is further capable of updating the locations in command completion register 166 to indicate the particular commands that have completed execution. For example, consider the case where CU 180-1 completes execution of a command stored in slot 5. CU interrupt circuit 172 receives an interrupt from CU 180-1 and updates the location in CU completion register 174 corresponding to CU 180-1. Controller 168 receives an interrupt from CU interrupt circuit 172 and determines that CU 180-1 has completed execution of a command by reading CU completion register 174. Controller 168 is capable of determining that CU 180-1 executed the command from slot 5. Accordingly, controller 168 is capable of writing to the location corresponding to slot 5 in command completion register 166. As discussed, writing to command completion register 166 causes an interrupt to be generated to host processor 105.

In the example of FIG. 1, controller 168 is coupled to command queue 162, command request register 164, command completion register 166, CU DMA circuit 170, CU interrupt circuit 172, and CU completion register 174. In one or more embodiments, controller 168 may be coupled to such circuit blocks using direct connections. In other embodiments, controller 168 may be coupled to such circuit blocks through interconnect circuitry. Interface 155 may be coupled to command queue 162, command request register 164, and command completion register 166 via direct connections or interconnect circuitry. Similarly, CUs 180 may be coupled to CU DMA circuit 170 and/or CU interrupt circuit 172 via direct connections or interconnect circuitry.

An example of interconnect circuitry is an Advanced Microcontroller Bus Architecture (AMBA) eXtensible Interface (AXI) bus. An AMBA AXI bus is an embedded microcontroller bus interface for use in establishing on-chip connections between circuit blocks and/or systems. AXI is provided as an illustrative example of interconnect circuitry and is not intended as a limitation of the embodiments described within this disclosure. Other examples of interconnects that may be used include, but are not limited to, other types of buses, a network-on-chip (NoC), a cross-bar, or other type of switch.

In one or more embodiments, memory controller 185 is implemented within IC 150. In one example, memory controller 185 is implemented as a hardwired circuit block. In another example, memory controller 185 is implemented using programmable circuitry of IC 150. In one or more other embodiments, memory controller 185 may be implemented external to IC 150, e.g., in another IC coupled to IC 150.

Memory 190 may be included as an off-chip memory that may be accessed (e.g., read and/or written) by CUs 180 via memory controller 185. In one or more embodiments, host processor 105 may also access (e.g., read and/or write) memory 190 via interface 155, a host DMA circuit 192, and memory controller 185. Memory 190 may be coupled to the circuit board on which IC 150 is coupled. Thus, in particular embodiments, CUs 180 may retrieve input arguments for command execution from memory 190 and store results of executed commands in memory 190. Host processor 105 may then retrieve the results from memory 190.

For purposes of description and ease of illustration, "Open Computing Language" or "OpenCL™" terminology is used throughout this application. It should be appreciated that any of a variety of different frameworks and/or languages supporting HCPs may be used. As such, the inventive arrangements are not intended to be limited to OpenCL. Rather, the embodiments described within this disclosure may be used with any of a variety of suitable and different HCP frameworks. Examples of other HCP and/or hardware acceleration frameworks that may be used with the embodiments described within this disclosure include, but are not limited to, Open Multi-Processing (OpenMP®) and CUDA®.

Figure 2:
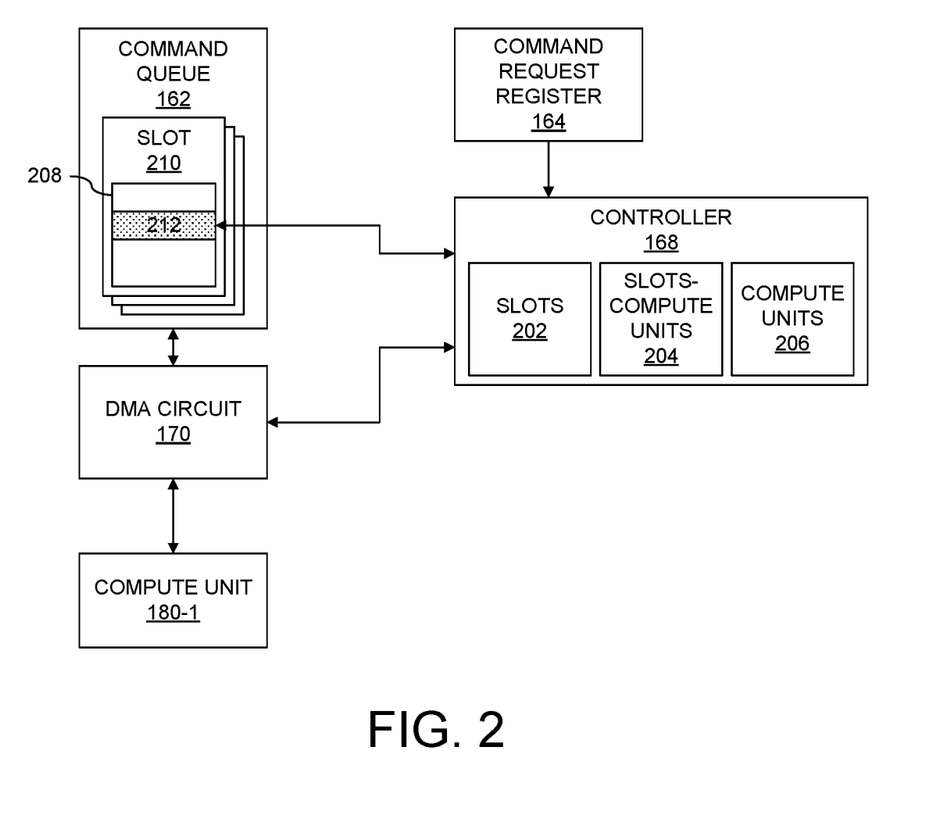
FIG. 2 illustrates example operations performed by the scheduling system in accordance with one or more embodiments described within this disclosure.

FIG. 2 illustrates example operations performed by scheduling system 160 of FIG. 1 in accordance with one or more embodiments described within this disclosure. In the example of FIG. 2, certain circuit blocks of scheduling system 160 are omitted for purposes of clarity and ease of description.

As pictured, controller 168 includes a plurality of data structures, e.g., tables or lists. For example, controller 168 includes a slot list 202 that lists the slots included in command queue 162 and whether the slot includes a command, a slots-CUs list 204 that lists CUs and the slots (e.g., commands) assigned to the CUs for execution, and a CUs list 206 that lists the CUs and the status of each CU as idle or started. CUs list 206 may also specify a base address for each CU.

In the example of FIG. 2, host processor 105 has stored a new command 208 within slot 210 of command queue 162 and written to a location in command request register 164 corresponding to slot 210. In response to the location in command request register 164 being written, command request register 164 generates an interrupt to controller 168. Controller 168, in response to the interrupt, reads command request register 164 to determine which locations have been written therein indicating the availability of new commands in the corresponding slots of command queue 162. As noted, once read by controller 168, command request register 164 is cleared.

Controller 168 is capable of reading new command 208 within slot 210. For example, controller 168, by way of reading command request register 164, determines that slot 210 has a new command stored therein. In particular embodiments, controller 168 is capable of reading only selected portions (e.g., less than the entirety) of new command 208 to reduce the amount of time necessary to process new command 208. In the example of FIG. 2, new command 208 includes a region 212. Region 212 specifies a list of CUs that are capable of executing new command 208. Each command written into a slot of command queue 162 may include a region such as region 212 that lists the CUs that are capable of, and therefore allowed, to execute the command. Certain CUs may only be able to execute certain commands.

In the example of FIG. 2, controller 168 is capable of directly reading region 212 without reading the remainder of new command 208. In particular embodiments, region 212 includes a list of CU indexes that specify the particular CUs that are capable of executing new command 208. For example, region 212 may specify indexes of 1, 2, 4, and 5. Controller 168 compares the list of CUs specified in region 212 (e.g., CUs 180-1, 180-2, 180-4, and 180-5) with CUs list 206 to determine whether any of the CUs (e.g., indexes 1, 2, 4, and 5) that are permitted to execute new command 208 is/are available.

Controller 168 is capable of selecting a CU from CUs list 206 that is idle (e.g., available) and that is also capable of executing new command 208. Controller 168, for example, is capable of comparing CU indexes from region 212 with available CUs from CUs list 206 to determine a match. For purposes of illustration, CU 180-1 may be idle, while CUs 180-2, 180-4, and 180-5 are started. Controller 168 is capable of selecting CU 180-1 and writing the base address of CU 180-1 to region 212, e.g., overwriting region 212 and the list of allowable CUs contained therein with the base address of CU 180-1. Overwriting region 212 saves memory since the information contained in region 212 is intended for controller 168 and is not needed to execute new command 208 once a CU is selected to execute new command 208. In one or more other embodiments, controller 168 may store the base address of the selected CU within slot 210 without overwriting any portion of new command 208.

Writing the base address of the selected CU, e.g., CU 180-1, into region 212 effectively assigns the selected CU to slot 210 and to new command 208. Controller 168 is also capable of updating slots-CUs list 204 to specify the association between the selected CU (e.g., CU 180-1) and slot 210. Further, controller 168 updates CUs list 206 to indicate that the selected CU 180-1 is started.

Having selected a CU to execute command 208, controller 168 is capable of passing the index of slot 210 to CU DMA circuit 170. For purposes of illustration, the slot index of slot 210 may be 32. Controller 168 is capable of writing the slot index 32 to a register in CU DMA circuit 170. CU DMA circuit 170, in response to receiving the slot index from controller 168, accesses slot index 32 corresponding to slot 210 and reads the base address of the selected CU 180-1.

CU DMA circuit 170, using the base address of CU 180-1, is capable of transferring command 208, e.g., the data contained in command 208, to CU 180-1 for execution. CU DMA circuit 170 is capable of transferring the data directly to the selected CU so that controller 168 is not involved in the actual data transfer to the CUs. Once the data is transferred to CU 180-1, CU DMA circuit 170 signals CU 180-1 to start or begin executing the command.

New command 208, as transferred to the selected CU, may include a variety of information including, but not limited to, addresses or pointers to locations in memory (e.g., memory 190) that contain the input arguments for the selected CU to operate on and/or the memory address to which the selected CU is to write results.

Figure 3A:
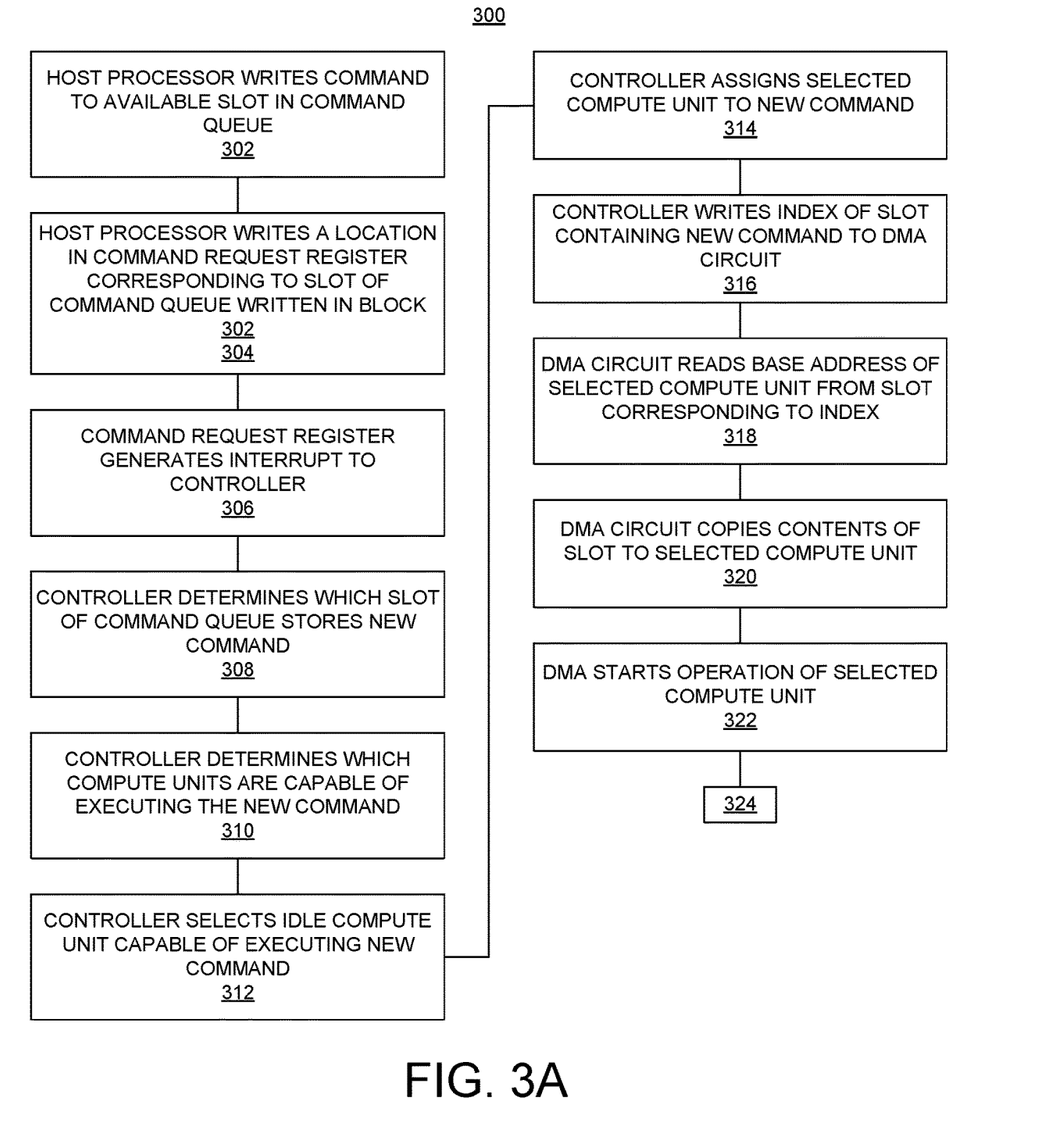
FIGS. 3A and 3B, taken collectively, illustrate an example method of operation for an HCP in accordance with one or more embodiments described within this disclosure.
Figure 3B:
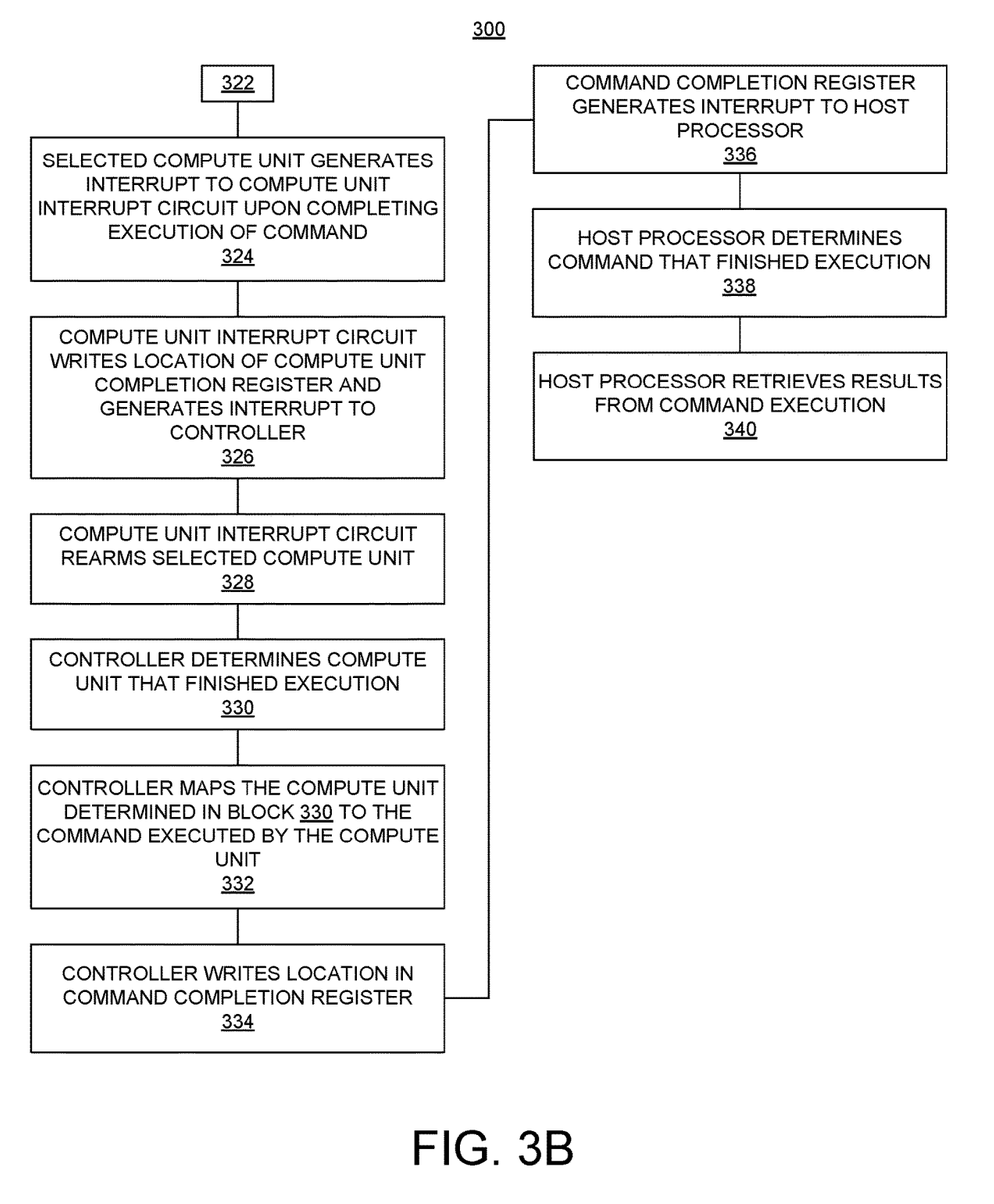

FIGS. 3A and 3B, taken collectively, illustrate an example method 300 of operation for an HCP in accordance with one or more embodiments described within this disclosure. Method 300 illustrates example operations performed by an HCP such as the HCP described in connection with FIG. 1 to offload commands to an IC including CUs. Method 300 may begin in a state where HCP 100 is operating. Host processor 105 is capable of performing the operations described with reference to FIGS. 3A and 3B through, at least in part, execution of the runtime library that provides functions for communicating with IC 150 and scheduling system 160 contained therein. As noted, host processor 105 further may execute a driver for communicating with IC 150.

For purposes of illustration, method 300 is described with reference to receiving a single command and the operation of a single CU executing the command. It should be appreciated that the principles described within this disclosure may be applied to cases where a plurality of commands are received from the host system and executed by a plurality of different CUs.

In block 302, the host processor writes a command to an available slot in the command queue. The host processor, for example, in executing an application, determines that a command is to be offloaded to the IC for hardware acceleration. In doing so, the host processor, e.g., the runtime library, is capable of tracking the availability of slots within the command queue and writing the command to such an available slot within the command queue.

In block 304, the host processor writes to a location, e.g., a slot index, in the command request register corresponding to the slot of the command queue written in block 302. For example, the host processor is capable of writing to the location in the command request register in response to, or immediately after, writing the slot in block 302.

In block 306, the command request register, in response to the host processor writing to the location in block 304, generates in interrupt to the controller. In block 308, the controller, in response to the interrupt from the command request register, determines which slot in the command queue includes or stores the new command from the host processor. For example, in response to the interrupt from the command request register, the controller reads the command request register to determine which locations therein have been written. Each location may correspond to a particular slot of the command queue. Once the controller reads the command request register, the contents of the command request register are cleared. As discussed, through method 300 illustrates the handling of a single command, multiple commands may have been written to the command queue since the interrupt was generated by the command request register. As such, the controller is capable of determining each of a plurality of slots of the command queue that include a new command from reading the command request register.

In block 310, the controller determines which CU(s) is/are capable of executing the new command. For example, the controller is capable of reading at least a portion of the new command from the slot in the command queue. In particular embodiments, the controller is capable of reading only the particular region of the new command that specifies a list of indexes of CUs that are capable of executing the new command. The controller need not read the entirety of the new command to determine the CUs that are capable of executing the new command, thereby reducing the latency for initiating execution of the new command in a CU.

In block 312, the controller selects an idle CU that is capable of executing the new command. For example, the controller is capable of comparing the CU(s) that are capable of executing the new command as read from the new command itself with a list of CU(s) that are idle (e.g., available). The controller selects a CU that is included on both lists (e.g., a CU that is both capable of executing the new command and that is idle) for executing the new command. For example, the controller is capable of matching a CU specified as capable of executing the new command with an idle CU.

In block 314, the controller assigns the selected CU to the new command. For example, the controller is capable of writing a base address for the selected CU to the slot that includes the new command. In one or more embodiments, the controller appends the base address to the command. In one or more other embodiments, the controller overwrites the list of CUs that are capable of executing the new command within the new command itself with the base address of the selected CU.

In particular embodiments, the controller is further capable of updating any internal data structures used to track the status of the CUs to indicate that the selected CU is now started (e.g., unavailable for use in executing a further command) and/or to store the association between the selected CU and the new command. It should be appreciated that while the controller has marked the selected CU as started, the selected CU has not actually been signaled to start operation.

In block 316, the controller writes the index of the slot containing the new command to the CU DMA circuit. In block 318, the CU DMA circuit, in response to receiving the index of the slot, reads the base address of the selected CU from the slot containing the new command. For example, the CU DMA circuit is capable of accessing the slot using the index and further indexing into the command to a predetermined location where the controller has stored the base address of the selected CU.

In block 320, the CU DMA circuit copies the contents of the slot containing the new command to the selected CU. The CU DMA circuit uses the base address of the selected CU to provide the new command to the selected CU. The contents of the slot, e.g., the new command, include memory addresses specifying where the arguments to be input to the selected CU are stored and memory address to which the selected CU is to store any results generated by executing the new command. The base address of the CU need not be copied. In block 322, CU DMA circuit starts operation of the selected CU.

In block 324, the selected CU generates an interrupt to the CU interrupt circuit upon completing execution of the new command. As noted, the interrupt lines from the CUs may be indexed thereby allowing the CU interrupt circuit to determine the particular CU that completed execution.

In block 326, in response to receiving the interrupt from the selected CU, the CU interrupt circuit writes to a location in the CU completion register corresponding to the selected CU and generates an interrupt to the controller.

In block 328, the CU interrupt circuit is capable of rearming the selected CU. For example, when a CU completes execution of a command, the CU interrupt circuit must rearm the selected CU prior to being used to execute another command. The CU interrupt circuit rearms the selected CU by initiating several transactions to the selected CU over the interface. The CU interrupt circuit is capable of performing these operations in response to receiving an interrupt from a CU. As discussed, the interface through which the CU interrupt circuit communicates with the CU operates at a slower clock frequency than the controller. By using the CU interrupt circuit to perform the rearming of CUs, the controller is relieved from doing so and is able to perform other operations thereby improving overall performance of the scheduling system as opposed to initiating and waiting for several transactions to complete over the slower interface.

In block 330, the controller, in response to receiving the interrupt from the CU interrupt circuit, determines the CU that has finished execution of a command, e.g., the selected CU in this example. For example, the controller is capable of reading the CU completion register in response to the interrupt from the CU interrupt circuit. The controller determines the particular CU that completed execution based upon which locations in the CU completion register have been written. Since the CU completion register may be implemented as a clear-on-read register, the CU interrupt circuit may continue to write to locations in the CU completion register in response to receiving further interrupts from further CUs. The CU interrupt circuit, however, need not continue to generate further interrupts. The CU interrupt circuit may keep the previously generated interrupt set until the controller responds by reading the CU completion register, which is then cleared.

In block 332, the controller maps the CU determined in block 330 to the command that was executed by the CU. For example, the controller is capable determining the particular command, e.g., the new command in this example, executed by the CU determined in block 330 from the internal data structures maintained by the controller that specify a mapping of slots in the command queue to CUs.

In block 334, controller writes to the location in the command completion register corresponding to the new command that finished execution by the selected CU. In block 336, in response to being written by the controller, the command completion register generates an interrupt to the host processor. In particular embodiments, the interrupt is provided to a driver for the IC that is executed in the host system.

Since the command completion register may be implemented as a clear-on-read register, the controller may continue to write to locations in the command completion register in response to receiving further interrupts indicating that further CUs have completed execution. The command completion register, however, need not continue to generate further interrupts to the host processor. The command completion register may keep the previously generated interrupt set until the host processor responds by reading the command completion register, which is then cleared.

In embodiments where the command completion register includes multiple sub-registers, each sub-register may operate independently. That is, each sub-register is capable of generating an interrupt to the host processor independently of the others and maintaining that interrupt as set until that particular sub-register is read by the host system. Each sub-register may be implemented as a clear-on-read register that is cleared independently of the other sub-registers.

In block 338, in response to the interrupt from the command completion register, the host processor reads the command completion register to determine the particular command that finished execution. As discussed, the command completion register is then cleared. In particular embodiments, the host processor, e.g., in executing the kernel driver, maintains a list of slot indices corresponding the number of slots in command queue. The host processor is capable of tracking the availability of slots in the command queue just as the controller is capable of tracking CU availability.

In block 340, the host processor retrieves results from execution of the new command. As discussed, any result data generated by the selected CU is stored in memory at a location initially specified by the host processor within the new command itself. The host processor, as part of generating and providing commands to the IC, manages the memory addresses where arguments for the CUs are stored and the memory addresses to which CUs write resulting data. The host processor is capable of storing the arguments at the memory addresses for consumption by the CUs and retrieving the results from the memory addresses.

The example embodiments described herein illustrate how the scheduling system controls operation of the CUs. The host system is aware of the commands being executed and when such commands have completed execution. The host system is not aware of the particular CUs used to execute any given command.

In accordance with the inventive arrangements described within this disclosure, the controller is capable of performing out of order hardware scheduling based on available commands and available CUs. The controller is capable of multi-user and multi-tasked operation. The scheduling system described herein is capable of reducing or hiding latency occurring over the interface between the host system and the IC. Further, the scheduling system described herein reduces the workload placed on the host processor and on the controller included in the scheduling system, thereby increasing performance of the entire HCP.

Figure 4:
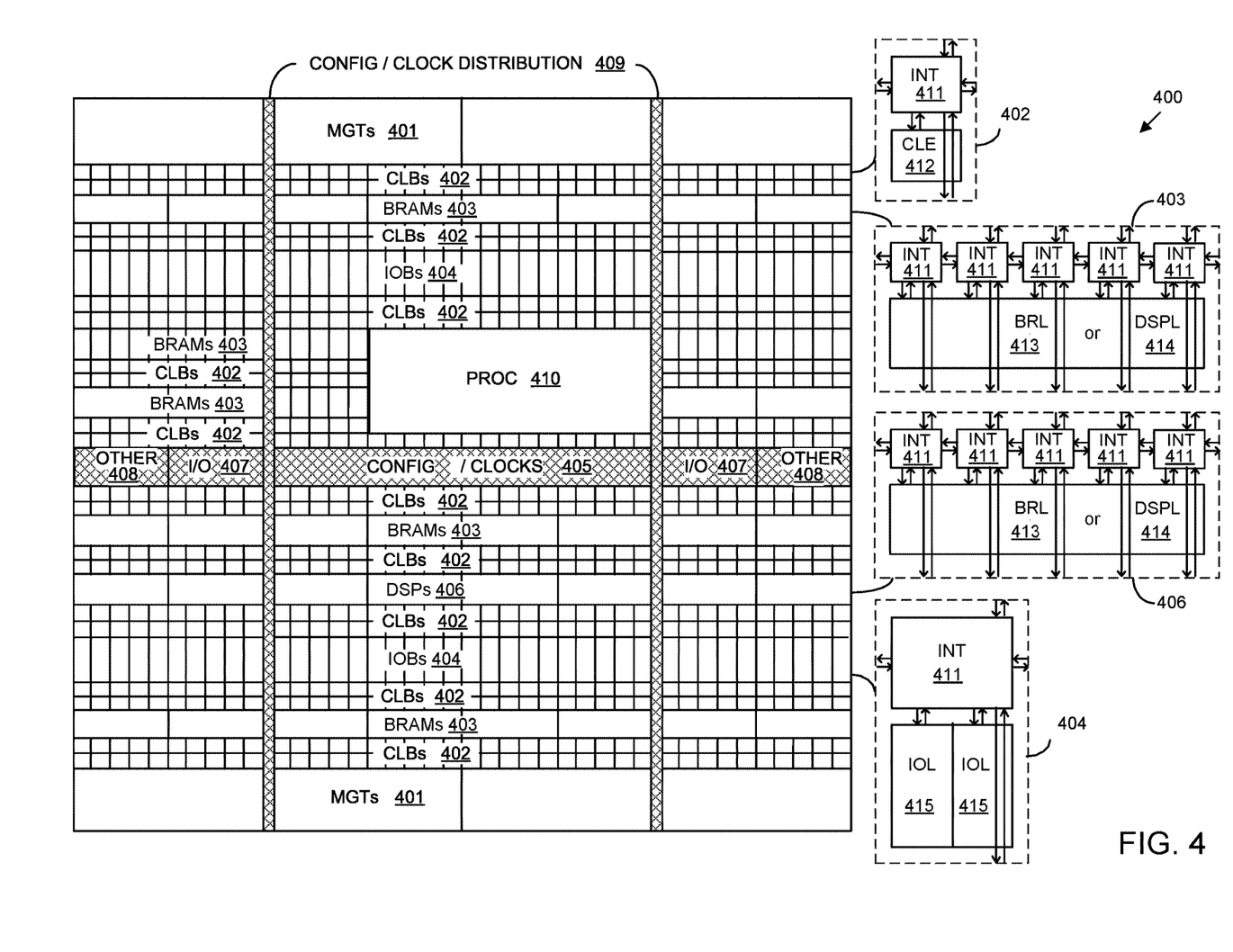
FIG. 4 illustrates an example architecture for an integrated circuit (IC).

FIG. 4 illustrates an example architecture 400 for an IC. In one aspect, architecture 400 may be implemented within a programmable IC. For example, architecture 400 may be used to implement an FPGA. Architecture 400 may also be representative of a system-on-chip (SoC) type of IC. An SoC is an IC that includes a processor that executes program code and one or more other circuits. The other circuits may be implemented as hardwired circuitry, programmable circuitry, and/or a combination thereof. The circuits may operate cooperatively with one another and/or with the processor.

As shown, architecture 400 includes several different types of programmable circuit, e.g., logic, blocks. For example, architecture 400 may include a large number of different programmable tiles including multi-gigabit transceivers (MGTs) 401, configurable logic blocks (CLBs) 402, random-access memory blocks (BRAMs) 403, input/output blocks (IOBs) 404, configuration and clocking logic (CONFIG/CLOCKS) 405, digital signal processing blocks (DSPs) 406, specialized I/O blocks 407 (e.g., configuration ports and clock ports), and other programmable logic 408 such as digital clock managers, analog-to-digital converters, system monitoring logic, and so forth.

In some ICs, each programmable tile includes a programmable interconnect element (INT) 411 having standardized connections to and from a corresponding INT 411 in each adjacent tile. Therefore, INTs 411, taken together, implement the programmable interconnect structure for the illustrated IC. Each INT 411 also includes the connections to and from the programmable logic element within the same tile, as shown by the examples included at the top of FIG. 4.

For example, a CLB 402 may include a configurable logic element (CLE) 412 that may be programmed to implement user logic plus a single INT 411. A BRAM 403 may include a BRAM logic element (BRL) 413 in addition to one or more INTs 411. Typically, the number of INTs 411 included in a tile depends on the height of the tile. As pictured, a BRAM tile has the same height as five CLBs, but other numbers (e.g., four) also may be used. A DSP tile 406 may include a DSP logic element (DSPL) 414 in addition to an appropriate number of INTs 411. An 10B 404 may include, for example, two instances of an I/O logic element (IOL) 415 in addition to one instance of an INT 411. The actual I/O pads connected to IOL 415 may not be confined to the area of IOL 415.

In the example pictured in FIG. 4, a columnar area near the center of the die, e.g., formed of regions 405, 407, and 408, may be used for configuration, clock, and other control logic. Horizontal areas 409 extending from this column may be used to distribute the clocks and configuration signals across the breadth of the programmable IC.

Some ICs utilizing the architecture illustrated in FIG. 4 include additional logic blocks that disrupt the regular columnar structure making up a large part of the IC. The additional logic blocks may be programmable blocks and/or dedicated circuitry. For example, a processor block depicted as PROC 410 spans several columns of CLBs and BRAMs.

In one aspect, PROC 410 may be implemented as dedicated circuitry, e.g., as a hardwired processor, that is fabricated as part of the die that implements the programmable circuitry of the IC. PROC 410 may represent any of a variety of different processor types and/or systems ranging in complexity from an individual processor, e.g., a single core capable of executing program code, to an entire processor system having one or more cores, modules, co-processors, interfaces, or the like.

In another aspect, PROC 410 may be omitted from architecture 400 and replaced with one or more of the other varieties of the programmable blocks described. Further, such blocks may be utilized to form a "soft processor" in that the various blocks of programmable circuitry may be used to form a processor that can execute program code as is the case with PROC 410.

The phrase "programmable circuitry" refers to programmable circuit elements within an IC, e.g., the various programmable or configurable circuit blocks or tiles described herein, as well as the interconnect circuitry that selectively couples the various circuit blocks, tiles, and/or elements according to configuration data that is loaded into the IC. For example, circuit blocks shown in FIG. 4 that are external to PROC 410 such as CLBs 402 and BRAMs 403 are considered programmable circuitry of the IC.

In general, the functionality of programmable circuitry is not established until configuration data is loaded into the IC. A set of configuration bits may be used to program programmable circuitry of an IC such as an FPGA. The configuration bit(s) typically are referred to as a "configuration bitstream." In general, programmable circuitry is not operational or functional without first loading a configuration bitstream into the IC. The configuration bitstream effectively implements a particular circuit design within the programmable circuitry. The circuit design specifies, for example, functional aspects of the programmable circuit blocks and physical connectivity among the various programmable circuit blocks.

Circuitry that is "hardwired" or "hardened," i.e., not programmable, is manufactured as part of the IC. Unlike programmable circuitry, hardwired circuitry or circuit blocks are not implemented after the manufacture of the IC through the loading of a configuration bitstream. Hardwired circuitry is generally considered to have dedicated circuit blocks and interconnects, for example, that are functional without first loading a configuration bitstream into the IC, e.g., PROC 410.

In some instances, hardwired circuitry may have one or more operational modes that can be set or selected according to register settings or values stored in one or more memory elements within the IC. The operational modes may be set, for example, through the loading of a configuration bitstream into the IC. Despite this ability, hardwired circuitry is not considered programmable circuitry as the hardwired circuitry is operable and has a particular function when manufactured as part of the IC.

In the case of an SoC, the configuration bitstream may specify the circuitry that is to be implemented within the programmable circuitry and the program code that is to be executed by PROC 410 or a soft processor. In some cases, architecture 400 includes a dedicated configuration processor that loads the configuration bitstream to the appropriate configuration memory and/or processor memory. The dedicated configuration processor does not execute user-specified program code. In other cases, architecture 400 may utilize PROC 410 to receive the configuration bitstream, load the configuration bitstream into appropriate configuration memory, and/or extract program code for execution.

Scheduling system 160 may be implemented using an IC having an architecture as described in connection with FIG. 4. For example, BRAMs and/or registers within the programmable circuitry may be used to implement one or more of the registers described herein with further supporting circuitry created from additional programmable circuitry. PROC 410 may be used to implement controller 168. Programmable circuitry may be used to implement interface 155 and CUs 180. In particular embodiments, memory controller 185 is hardwired. In other embodiments, memory controller 185 is also implemented using programmable circuitry.

FIG. 4 is intended to illustrate an example architecture that may be used to implement an IC that includes programmable circuitry, e.g., a programmable fabric. For example, the number of logic blocks in a column, the relative width of the columns, the number and order of columns, the types of logic blocks included in the columns, the relative sizes of the logic blocks, and the interconnect/logic implementations included at the top of FIG. 4 are purely illustrative. In an actual IC, for example, more than one adjacent column of CLBs is typically included wherever the CLBs appear, to facilitate the efficient implementation of a user circuit design. The number of adjacent CLB columns, however, may vary with the overall size of the IC. Further, the size and/or positioning of blocks such as PROC 410 within the IC are for purposes of illustration only and are not intended as limitations.

For purposes of explanation, specific nomenclature is set forth to provide a thorough understanding of the various inventive concepts disclosed herein. The terminology used herein, however, is for the purpose of describing particular aspects of the inventive arrangements only and is not intended to be limiting.

As defined herein, the singular forms "a," "an," and "the" are intended to include the plural forms as well, unless the context clearly indicates otherwise.

As defined herein, the terms "at least one," "one or more," and "and/or," are open-ended expressions that are both conjunctive and disjunctive in operation unless explicitly stated otherwise. For example, each of the expressions "at least one of A, B, and C," "at least one of A, B, or C," "one or more of A, B, and C," "one or more of A, B, or C," and "A, B, and/or C" means A alone, B alone, C alone, A and B together, A and C together, B and C together, or A, B and C together.

As defined herein, the term "automatically" means without user intervention. As defined herein, the term "user" means a human being.

As defined herein, the term "computer readable storage medium" means a storage medium that contains or stores program code for use by or in connection with an instruction execution system, apparatus, or device. As defined herein, a "computer readable storage medium" is not a transitory, propagating signal per se. A computer readable storage medium may be, but is not limited to, an electronic storage device, a magnetic storage device, an optical storage device, an electromagnetic storage device, a semiconductor storage device, or any suitable combination of the foregoing. The various forms of memory, as described herein, are examples of computer readable storage media. A non-exhaustive list of more specific examples of a computer readable storage medium may include: a portable computer diskette, a hard disk, a RAM, a read-only memory (ROM), an erasable programmable read-only memory (EPROM or Flash memory), an electronically erasable programmable read-only memory (EEPROM), a static random-access memory (SRAM), a portable compact disc read-only memory (CD-ROM), a digital versatile disk (DVD), a memory stick, a floppy disk, or the like.

As defined herein, the term "if" means "when" or "upon" or "in response to" or "responsive to," depending upon the context. Thus, the phrase "if it is determined" or "if [a stated condition or event] is detected" may be construed to mean "upon determining" or "in response to determining" or "upon detecting [the stated condition or event]" or "in response to detecting [the stated condition or event]" or "responsive to detecting [the stated condition or event]" depending on the context.

As defined herein, the term "responsive to" and similar language as described above, e.g., "if," "when," or "upon," means responding or reacting readily to an action or event. The response or reaction is performed automatically. Thus, if a second action is performed "responsive to" a first action, there is a causal relationship between an occurrence of the first action and an occurrence of the second action. The term "responsive to" indicates the causal relationship.

As defined herein, the terms "one embodiment," "an embodiment," "one or more embodiments," "particular embodiments," or similar language mean that a particular feature, structure, or characteristic described in connection with the embodiment is included in at least one embodiment described within this disclosure. Thus, appearances of the phrases "in one embodiment," "in an embodiment," "in one or more embodiments," "in particular embodiments," and similar language throughout this disclosure may, but do not necessarily, all refer to the same embodiment. The terms "embodiment" and "arrangement" are used interchangeably within this disclosure.

As defined herein, the term "processor" means at least one hardware circuit. The hardware circuit may be configured to carry out instructions contained in program code. The hardware circuit may be an integrated circuit. Examples of a processor include, but are not limited to, a central processing unit (CPU), an array processor, a vector processor, a digital signal processor (DSP), an FPGA, a programmable logic array (PLA), an ASIC, programmable logic circuitry, and a controller.

As defined herein, the term "output" means storing in physical memory elements, e.g., devices, writing to display or other peripheral output device, sending or transmitting to another system, exporting, or the like.

As defined herein, the term "real time" means a level of processing responsiveness that a user or system senses as sufficiently immediate for a particular process or determination to be made, or that enables the processor to keep up with some external process.

As defined herein, the term "substantially" means that the recited characteristic, parameter, or value need not be achieved exactly, but that deviations or variations, including for example, tolerances, measurement error, measurement accuracy limitations, and other factors known to those of skill in the art, may occur in amounts that do not preclude the effect the characteristic was intended to provide.

The terms first, second, etc. may be used herein to describe various elements. These elements should not be limited by these terms, as these terms are only used to distinguish one element from another unless stated otherwise or the context clearly indicates otherwise.

A computer program product may include a computer readable storage medium (or media) having computer readable program instructions thereon for causing a processor to carry out aspects of the inventive arrangements described herein. Within this disclosure, the term "program code" is used interchangeably with the term "computer readable program instructions." Computer readable program instructions described herein may be downloaded to respective computing/processing devices from a computer readable storage medium or to an external computer or external storage device via a network, for example, the Internet, a LAN, a WAN and/or a wireless network. The network may include copper transmission cables, optical transmission fibers, wireless transmission, routers, firewalls, switches, gateway computers and/or edge devices including edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations for the inventive arrangements described herein may be assembler instructions, instruction-set-architecture (ISA) instructions, machine instructions, machine dependent instructions, microcode, firmware instructions, or either source code or object code written in any combination of one or more programming languages, including an object-oriented programming language and/or procedural programming languages. Computer readable program instructions may include state-setting data. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or a WAN, or the connection may be made to an external computer (for example, through the Internet using an Internet Service Provider). In some cases, electronic circuitry including, for example, programmable logic circuitry, an FPGA, or a PLA may execute the computer readable program instructions by utilizing state information of the computer readable program instructions to personalize the electronic circuitry, in order to perform aspects of the inventive arrangements described herein.

Certain aspects of the inventive arrangements are described herein with reference to flowchart illustrations and/or block diagrams of methods, apparatus (systems), and computer program products. It will be understood that each block of the flowchart illustrations and/or block diagrams, and combinations of blocks in the flowchart illustrations and/or block diagrams, may be implemented by computer readable program instructions, e.g., program code.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the operations specified in the flowchart and/or block diagram block or blocks.

The computer readable program instructions may also be loaded onto a computer, other programmable data processing apparatus, or other device to cause a series of operations to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various aspects of the inventive arrangements. In this regard, each block in the flowchart or block diagrams may represent a module, segment, or portion of instructions, which comprises one or more executable instructions for implementing the specified operations.

In some alternative implementations, the operations noted in the blocks may occur out of the order noted in the figures. For example, two blocks shown in succession may be executed substantially concurrently, or the blocks may sometimes be executed in the reverse order, depending upon the functionality involved. In other examples, blocks may be performed generally in increasing numeric order while in still other examples, one or more blocks may be performed in varying order with the results being stored and utilized in subsequent or other blocks that do not immediately follow. It will also be noted that each block of the block diagrams and/or flowchart illustration, and combinations of blocks in the block diagrams and/or flowchart illustration, may be implemented by special purpose hardware-based systems that perform the specified functions or acts or carry out combinations of special purpose hardware and computer instructions.

The corresponding structures, materials, acts, and equivalents of all means or step plus function elements that may be found in the claims below are intended to include any structure, material, or act for performing the function in combination with other claimed elements as specifically claimed.

One or more embodiments are directed to an integrated circuit (IC). The IC includes a command queue having a plurality of slots configured to store commands from a host processor for execution by a plurality of compute units of the IC and a command request register having a plurality of locations corresponding to the plurality of slots in the command queue. The command request register is configured to generate an interrupt indicating a new command stored within the command queue. The IC includes a controller configured to, in response to the interrupt from the command request register, determine a selected compute unit that is idle from the plurality of compute units to execute the new command and a compute unit direct memory access circuit configured to provide the new command to the selected compute unit.

In an aspect, the new command includes a first list specifying one or more of the plurality of compute units capable of executing the new command.

In another aspect, the controller is configured to maintain a second list specifying which of the plurality of compute units is idle and determine the selected compute unit to execute the new command by comparing the first list with the second list.

In another aspect, the controller is configured to update the new command in the command queue to specify a base address for the selected compute unit.

In another aspect, the controller is configured to overwrite the first list with the base address of the selected compute unit.

In another aspect, the controller is configured to provide the compute unit direct memory access circuit with a reference to a selected slot of the plurality of slots in the command queue that stores the new command.

In another aspect, the compute unit direct memory access circuit is configured to provide the new command in the selected slot to the selected compute unit using the base address from the new command.

In another aspect, the command request register is a clear-on-read register.

In another aspect, the compute unit direct memory access circuit is further configured to start operation of the selected compute unit in response to providing the new command.

One or more embodiments are directed an IC. The IC includes a compute unit interrupt circuit configured to, in response to receiving an interrupt from a selected compute unit of a plurality of compute units indicating that the selected compute unit is finished processing, signal that the selected compute unit is finished processing and a compute unit completion register configured to generate an interrupt in response to the signal from the compute unit interrupt circuit. The IC includes a controller configured to, in response to the interrupt from the compute unit completion register, determine a selected command of a plurality of commands offloaded from a host processor was executed by the selected compute unit and output the selected command and a command completion register configured to generate an interrupt to the host processor indicating that the selected command of the plurality of commands has finished processing.

In an aspect, the compute unit completion register includes a plurality of locations corresponding to the plurality of compute units, wherein the compute unit interrupt circuit notifies the compute unit completion register that the selected compute unit is finished processing by writing to a selected location of the plurality of locations corresponding to the selected compute unit.

In another aspect, the controller is configured to maintain a list of the plurality of commands and corresponding compute units of the plurality of compute units executing the plurality of commands.

In another aspect, the compute unit completion register is a clear-on-read register.

In another aspect, the command completion register is a clear-on-read register.

In another aspect, the compute unit interrupt circuit is configured to rearm the selected compute unit to execute a further command from the host processor.

One or more embodiments are directed to a method. The method includes, in response to a notification from a host processor indicating availability of a new command within a command queue, generating an interrupt to a controller, the controller, in response to the interrupt, determining a selected compute unit that is idle from a plurality of compute units to execute the new command, and the controller notifying a compute unit direct memory access circuit of the selected compute unit and the new command in the command queue. The method also includes providing, using the compute unit direct memory access circuit, the new command to the selected compute unit.

In an aspect, the method includes, in response to receiving an interrupt from the selected compute unit indicating completion of execution, generating an interrupt to the controller indicating that the selected compute unit completed execution, determining, using the controller, that the new command was assigned to the selected compute unit, and generating an interrupt to the host processor indicating that the new command completed execution.

In another aspect, the notifying the compute unit direct memory access circuit of the selected compute unit and the new command in the command queue includes writing a base address of the selected compute unit to a selected slot of a plurality of slots in the command queue storing the new command and providing a reference to the selected slot of the plurality of slots to the compute unit direct memory access circuit.

In another aspect, the determining a selected compute unit from the plurality of compute units includes reading a first list specifying one or more of the plurality of compute units capable of executing the new command from within the new command and comparing the first list to a second list specifying compute units of the plurality of compute units that are idle to determine a common compute unit as the selected compute unit.

In another aspect, the notifying the compute unit direct memory access circuit of the selected compute unit and the new command in the command queue includes overwriting the first list of the new command with a base address of the selected compute unit, wherein the new command is stored in a selected slot of a plurality of slots in the command queue and providing a reference to the selected slot to the compute unit direct memory access circuit.

The description of the inventive arrangements provided herein is for purposes of illustration and is not intended to be exhaustive or limited to the form and examples disclosed. The terminology used herein was chosen to explain the principles of the inventive arrangements, the practical application or technical improvement over technologies found in the marketplace, and/or to enable others of ordinary skill in the art to understand the inventive arrangements disclosed herein. Modifications and variations may be apparent to those of ordinary skill in the art without departing from the scope and spirit of the described inventive arrangements. Accordingly, reference should be made to the following claims, rather than to the foregoing disclosure, as indicating the scope of such features and implementations.

What is claimed is:

1. An integrated circuit, comprising:
a plurality of compute units configured to perform operations offloaded by a host processor;
a command queue having a plurality of slots configured to store commands from the host processor for execution by the plurality of compute units;
a command request register having a plurality of locations corresponding to the plurality of slots in the command queue, wherein the command request register is configured to generate an interrupt indicating a new command stored within the command queue in response to the host processor writing a selected location of the plurality of locations of the command request register corresponding to a slot of the plurality of slots storing the new command;
a controller configured to, in response to the interrupt from the command request register, determine a selected compute unit that is idle from the plurality of compute units to execute the new command;
a compute unit direct memory access circuit configured to provide the new command to the selected compute unit; and
a circuitry having a command completion register configured to generate an interrupt to the host processor indicating that the new command completed execution in the selected compute unit.

2. The integrated circuit of claim 1, wherein the new command includes a first list specifying one or more of the plurality of compute units capable of executing the new command.

3. The integrated circuit of claim 2, wherein the controller is configured to maintain a second list specifying which of the plurality of compute units is idle and determine the selected compute unit to execute the new command by comparing the first list with the second list.

4. The integrated circuit of claim 2, wherein the controller is configured to update the new command in the command queue to specify a base address for the selected compute unit.

5. The integrated circuit of claim 4, wherein the controller is configured to overwrite the first list with the base address of the selected compute unit.

6. The integrated circuit of claim 4, wherein the controller is configured to provide the compute unit direct memory access circuit with a reference to a selected slot of the plurality of slots in the command queue that stores the new command.

7. The integrated circuit of claim 6, wherein the compute unit direct memory access circuit is configured to provide the new command in the selected slot to the selected compute unit using the base address from the new command.

8. The integrated circuit of claim 1, wherein the command request register is a clear-on-read register.

9. The integrated circuit of claim 1, wherein the compute unit direct memory access circuit is further configured to start operation of the selected compute unit in response to providing the new command.

10. An integrated circuit, comprising:
a plurality of compute units configured to perform operations offloaded by a host processor;
a compute unit interrupt circuit configured to, in response to receiving an interrupt from a selected compute unit of the plurality of compute units indicating that the selected compute unit is finished processing, signal that the selected compute unit is finished processing;
a compute unit completion register configured to generate an interrupt in response to the signal from the compute unit interrupt circuit;
a controller configured to, in response to the interrupt from the compute unit completion register, determine a selected command of a plurality of commands offloaded from the host processor was executed by the selected compute unit and output the selected command;
a command completion register configured to generate an interrupt to the host processor indicating that the selected command of the plurality of commands has finished processing; and
wherein the selected compute unit is determined from the plurality of compute units to execute the selected command by comparing a first list, from within the selected command, specifying one or more of the plurality of compute units capable of executing the selected command to a second list specifying compute units of the plurality of compute units that are idle to determine a common compute unit as the selected compute unit.

11. The integrated circuit of claim 10, wherein the compute unit completion register includes a plurality of locations corresponding to the plurality of compute units, wherein the compute unit interrupt circuit notifies the compute unit completion register that the selected compute unit is finished processing by writing to a selected location of the plurality of locations corresponding to the selected compute unit.

12. The integrated circuit of claim 10, wherein the controller is configured to maintain a list of the plurality of commands and corresponding compute units of the plurality of compute units executing the plurality of commands.

13. The integrated circuit of claim 10, wherein the compute unit completion register is a clear-on-read register.

14. The integrated circuit of claim 10, wherein the command completion register is a clear-on-read register.

15. The integrated circuit of claim 10, wherein the compute unit interrupt circuit is configured to rearm the selected compute unit to execute a further command from the host processor.

16. A method, comprising:
in response to a notification from a host processor indicating availability of a new command within a command queue, generating an interrupt to a controller;
the controller, in response to the interrupt, determining a selected compute unit that is idle from a plurality of compute units to execute the new command;
the controller notifying a compute unit direct memory access circuit of the selected compute unit and the new command in the command queue;

providing, using the compute unit direct memory access circuit, the new command to the selected compute unit;

generating an interrupt to the host processor indicating that the new command completed execution in the selected compute unit;

wherein the determining a selected compute unit from the plurality of compute units includes:

reading a first list specifying one or more of the plurality of compute units capable of executing the new command from within the new command; and comparing the first list to a second list specifying compute units of the plurality of compute units that are idle to determine a common compute unit as the selected compute unit.

17. The method of claim 16, further comprising:

in response to receiving an interrupt from the selected compute unit indicating completion of execution, generating an interrupt to the controller indicating that the selected compute unit completed execution;

determining, using the controller, that the new command was assigned to the selected compute unit; and wherein the generating the interrupt to the host processor indicating that the new command completed execution in the selected compute unit is performed responsive to the determining.

18. The method of claim 16, wherein the notifying the compute unit direct memory access circuit of the selected compute unit and the new command in the command queue comprises:

writing a base address of the selected compute unit to a selected slot of a plurality of slots in the command queue storing the new command; and providing a reference to the selected slot of the plurality of slots to the compute unit direct memory access circuit.

19. The method of claim 16, wherein the notifying the compute unit direct memory access circuit of the selected compute unit and the new command in the command queue comprises:

overwriting the first list of the new command with a base address of the selected compute unit, wherein the new command is stored in a selected slot of a plurality of slots in the command queue; and providing a reference to the selected slot to the compute unit direct memory access circuit.

* * * * *